C. R. PERRY & C. M. FINCH.
FILTER.
APPLICATION FILED OCT. 19, 1908.
922,326.
Patented May 18, 1909.
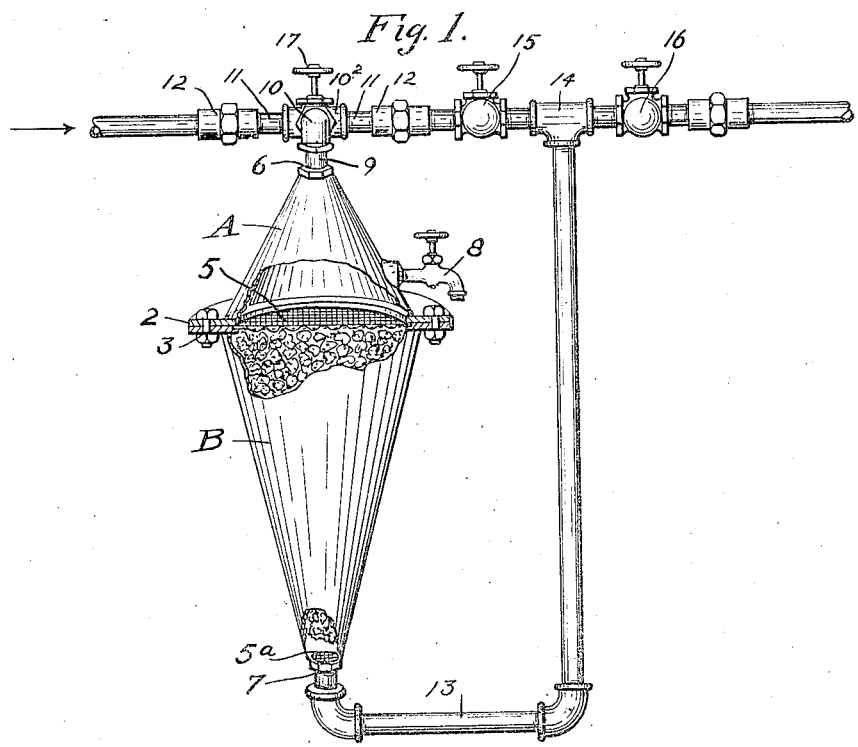
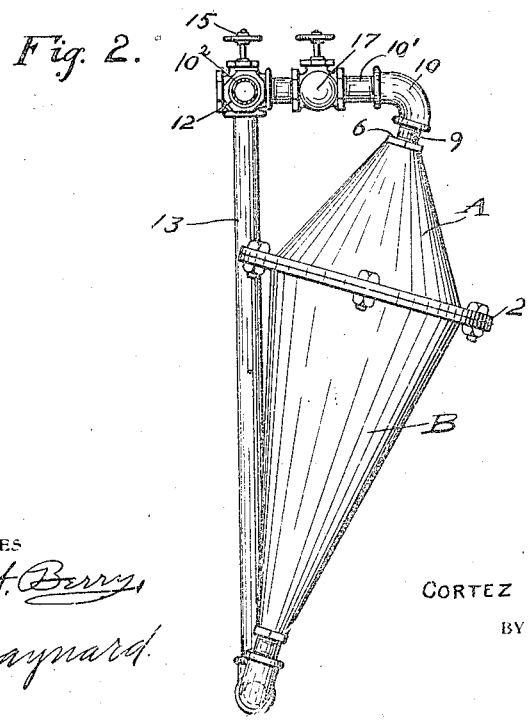
WITNESSES
INVENTORS
CORTEZ R. PERRY, CHARLES M. FINCH.
BY Geo. H. Strong.
THEIR ATTORNEY

UNITED STATES PATENT OFFICE.

CORTEZ R. PERRY AND CHARLES M. FINCH, OF SAN FRANCISCO, CALIFORNIA; SAID PERRY ASSIGNOR TO SAID FINCH.

FILTER.

No. 922,326.  Specification of Letters Patent.  Patented May 18, 1909.

Application filed October 19, 1908. Serial No. 458,407.

*To all whom it may concern:*

Be it known that we, CORTEZ R. PERRY and CHARLES M. FINCH, citizens of the United States, residing in the city and county of San Francisco and State of California, have invented new and useful Improvements in Filters, of which the following is a specification.

Our invention relates to improvements in filters.

It consists in a combination and arrangement of parts, and in details of construction which will be more fully explained by reference to the accompanying drawings, in which—

Figure 1 is a sectional elevation of the filter. Fig. 2 is an end view.

Our filter is composed of two frustums of cones, A and B; these frustums having annular flanges 2 around their larger ends, and these flanges 2 may be perforated or slotted, as shown at 3, for the reception of bolts by which their larger diameter may be secured together, and the frustums taper away from these flanges in each direction having substantially a common axis. One of the flanges has a sunken groove or channel around the inner portion, and within this is fitted a screen 5 of any suitable or desired mesh. The longer frustum is filled with a suitable filtering material, which is held in place at one end by the screen 5, and may be similarly held at the smaller end by a screen $5^a$, the two screens preventing the material from being washed out. At the smaller end of each of these cones are made openings as at 6 and 7; these openings serve for the attachment of the supply and distributing pipes. The supply pipe is connected with the shorter cone A, and the water admitted into the cone expands to the full diameter of the larger end, passing through the screen 5, and thence being received into the filter material. The water is thus distributed so as to first reach the filtering material, where the area is the largest, and the greater portion of the filtrate will be delivered upon the upper and larger area of the filtering material. This filtering material gradually contracts in area from the larger to the smaller end, and as the liquid to be filtered passes through it, the finer portions of the sediment will be gradually caught, and the diminished area of the filter will be sufficient for the constantly diminishing quantity of sediment which it is desired to deposit therein, so that when the liquid has reached the lower and smaller end of the filter it will have been substantially deprived of all the deleterious material which it may have contained, and by reason of the gradually decreasing area of the filter presented for the passage of the liquid, the heaviest portion will be arrested in the upper portion of the filter, while the smaller contracted portion will be sufficient to arrest any finer substances which may be carried by the liquid to that point; the filtering being substantially progressive from one end to the other of the filter.

Whenever at any time, it is desired to cleanse the filter, it may be done by reversing the flow of the liquid which may be introduced through the lower end of the longer cone, and pass backwardly through the filter end into the shorter cone A, from which it may escape through a cock at 8, which serves for the purpose; this passage being normally closed when the filter is in action.

If at any time it be desired to use the water without passing it through the filter, this may be done by means of a by-pass pipe connecting with the supply and discharge above and below the filter, and having suitable controlling cocks.

In order to conveniently separate the two parts of the filter to change the filtering material, or for other purposes when access to the interior is desired, the pipe 9 connects at its lower end with the upper cone A, and its opposite end connects with an elbow 10 on the end of a pipe $10^1$ leading from a tee $10^2$, having two short connecting pipes 11 in line. The ends of these pipes are turnable in unions 12 to which the supply pipe also connects.

The cone B is rigidly supported by the discharge pipe 13 which connects with a tee 14 in line with the supply pipe, and through which the discharge flows.

15 and 16 are cocks or valves by which the flow of water is controlled as previously described, thus if a direct flow of unfiltered water is desired, both these cocks are opened. If filtered water is wanted, cock 15 is closed, and water must then pass through the filter. If it is desired to wash the filter, cock 15 is opened, and 16 is closed, and the cock 8 is opened. The cock 17 is also closed to prevent water passing directly to the cone A. The pressure then operates to force water upwardly through the filter to wash it, and escape at 8.

When the filter is to be opened, the upper part A is disengaged from the part B, and is thus free to be turned about its swivel joint between the unions 11, thus exposing the lower section.

Having thus described our invention, what we claim and desire to secure by Letters Patent is—

1. The combination in a filter, of casings having a form of conical frustums, one of said cones having a greater length than the other, a screen fixed between the two cones, a filling of filtering material within the longer cone, openings at the smaller ends of each cone, the shorter cone acting to receive and distribute the liquid, and the longer cone to filter and concentrate, and a swivel support for said receiving cone.

2. A filter consisting of two conical frustums having pipe connecting openings in the smaller ends, flanges at the larger ends, and means by which said flanges are united, one of said flanges having an interior groove or channel, a filter screen fitting said groove and secured between the two cones, a filling of filtering material within the longer cone so disposed as to receive the largest area of the liquid at its receiving end, and to gradually concentrate the discharge of said liquid at the smaller end, and means forming a swiveled connection for the upper end of the receiving cone.

3. In a filter of the character described, conical chambers, connected and having a screen across their larger diameters, a body of filtering material inclosed in the outermost cone, a swiveled first cone, an inlet at the apex of the first cone, and a discharge from the apex of the second cone, whereby the water is expanded to the full diameter of the screen, and then passed through a constantly diminishing body of filtering material to the discharge.

4. In a filter of the character described, conical chambers separably united at their bases, supply and discharge pipes connected with opposite ends of the chambers, a fixed support for the discharge cone, and a swivel connection for the receiving cone.

5. In a filter of the character described, a fixed cone containing filtering material and having a discharge pipe at its smaller end, a receiving cone, flanges and separable connections uniting the bases of the cones, unions axially in line with the supply pipe, a swivel pipe turnable in the unions, and connections between said pipe and the upper cone.

6. In a filter of the character described, filter chambers separably united at their meeting ends, supply and discharge pipes, a swivel connection by which the receiving chamber is turnably connected with the supply pipe, and a controlling cock therefor, a pipe by which the other chamber is rigidly supported and connected with the discharge, and cocks upon either side of said connection whereby water may be delivered through the filter in either direction, or caused to pass directly without entering the filter.

In testimony whereof we have hereunto set our hands in presence of two subscribing witnesses.

CORTEZ R. PERRY.
CHAS. M. FINCH.

Witnesses:
M. D. BROWN,
W. D. BELL.